(12) United States Patent
Norton

(10) Patent No.: US 10,780,559 B2
(45) Date of Patent: Sep. 22, 2020

(54) HELICAL TOOTHED DRIVER AND COMPATIBLE FASTENER

(71) Applicant: William Norton, West Pittston, PA (US)

(72) Inventor: William Norton, West Pittston, PA (US)

( * ) Notice: Subject to any disclaimer, the term of this patent is extended or adjusted under 35 U.S.C. 154(b) by 127 days.

(21) Appl. No.: 15/955,736

(22) Filed: Apr. 18, 2018

(65) Prior Publication Data

US 2018/0304449 A1     Oct. 25, 2018

Related U.S. Application Data

(60) Provisional application No. 62/489,891, filed on Apr. 25, 2017, provisional application No. 62/490,426, (Continued)

(51) Int. Cl.
*B25B 23/10* (2006.01)
*B25B 15/00* (2006.01)
(Continued)

(52) U.S. Cl.
CPC ............... *B25B 23/108* (2013.01); *B21J 5/08* (2013.01); *B21K 1/463* (2013.01); *B23G 9/002* (2013.01);
(Continued)

(58) Field of Classification Search
CPC ....... B25B 27/18; B25B 23/108; B25B 23/08; B25B 23/10; B25B 23/103; B25B 15/005; B25B 15/001; B25B 23/105; B25B 15/004; B25B 15/007; B25B 15/02; B25B 23/101; B25B 15/105; B23G 9/002; B23G 9/001; B23G 9/009
(Continued)

(56) References Cited

U.S. PATENT DOCUMENTS 2,046,837 A    7/1936  Phillips
2,066,132 A *  12/1936  Zihler ..................... B25B 27/18
                                                76/101.1
(Continued)

OTHER PUBLICATIONS

Young, Lee W.; PCT International Search Report and Written Opinion regarding International Application No. PCT/US2018/28096; dated Aug. 28, 2018.

*Primary Examiner* — Orlando E Aviles
*Assistant Examiner* — Robert F Neibaur
(74) *Attorney, Agent, or Firm* — Ballard Spahr LLP

(57) ABSTRACT

A driver for applying torque to threaded fasteners has a plurality of teeth extending along and projecting outwardly from a longitudinal axis of a body on which the teeth are located. The teeth have a helical twist about the longitudinal axis. Each tooth has an angularly oriented engagement surface which is engageable with similarly angularly oriented surfaces within recesses in the head of a compatible fastener. When the driver engages the recesses torque applied to the driver draws the driver deeper into the recesses as the engagement surfaces react against and slide over the angularly oriented surfaces within the recesses. The torque also causes the fastener to turn and advance or retract depending upon the sense of the torque and the angles of the engagement surfaces and the angles of the surfaces within the recesses. The fastener and its method of manufacture are also disclosed.

25 Claims, 10 Drawing Sheets

Related U.S. Application Data filed on Apr. 26, 2017, provisional application No. 62/503,719, filed on May 9, 2017, provisional application No. 62/503,726, filed on May 9, 2017.

(51) Int. Cl.
*B21J 5/08* (2006.01)
*B21K 1/46* (2006.01)
*B23G 9/00* (2006.01)
*F16B 23/00* (2006.01)

(52) U.S. Cl.
CPC ........ *B25B 15/005* (2013.01); *F16B 23/0023* (2013.01)

(58) Field of Classification Search
USPC .......................................................... 81/475
See application file for complete search history.

(56) References Cited

U.S. PATENT DOCUMENTS

| | | |
|---|---|---|
| 2,431,628 A | 11/1947 | Waarich |
| 2,474,994 A | 7/1949 | Tomalis |
| 2,684,094 A | 7/1954 | Lissy |
| 3,037,539 A | 6/1962 | Johnson et al. |
| 3,825,048 A | 7/1974 | Triska |
| 4,089,357 A | 5/1978 | Gill |
| 4,130,152 A | 12/1978 | Bolen |
| 4,187,892 A | 2/1980 | Simmons |
| 4,191,228 A * | 3/1980 | Fenton ................ F16B 23/0007 81/436 |
| 4,339,971 A | 7/1982 | Zatorre |
| 4,355,552 A | 10/1982 | Gutshall |
| 4,430,035 A | 2/1984 | Rodseth |
| 4,572,039 A | 2/1986 | Desjardins |
| 4,625,598 A | 12/1986 | Wolfram |
| 4,936,172 A | 6/1990 | Jackson |
| 4,970,922 A * | 11/1990 | Krivec ................. B25B 15/005 81/451 |
| 5,353,667 A | 10/1994 | Wilner |
| 5,438,895 A | 8/1995 | Bassell et al. |
| 6,352,011 B1 * | 3/2002 | Fruhm ................. B25B 15/001 81/436 |
| 6,402,449 B1 | 6/2002 | Lin |
| 6,520,055 B1 * | 2/2003 | Reusch ................. B25B 15/005 81/436 |
| 7,000,501 B1 | 2/2006 | Chen |
| 7,073,416 B2 | 7/2006 | Kozak et al. |
| 7,150,211 B2 * | 12/2006 | Walker ................. B25B 15/005 81/436 |
| 7,311,026 B2 | 12/2007 | Melton |
| 8,448,547 B2 * | 5/2013 | Whitehead ............. B25B 27/18 81/441 |
| 2004/0000218 A1 | 1/2004 | Bergamo |
| 2007/0193419 A1 | 8/2007 | Melton |
| 2011/0252922 A1 | 10/2011 | Whitehead |
| 2012/0192685 A1 | 8/2012 | Dilling |
| 2014/0216214 A1 | 8/2014 | Lin |
| 2016/0332285 A1* | 11/2016 | Chen .................... B25B 15/008 |

* cited by examiner

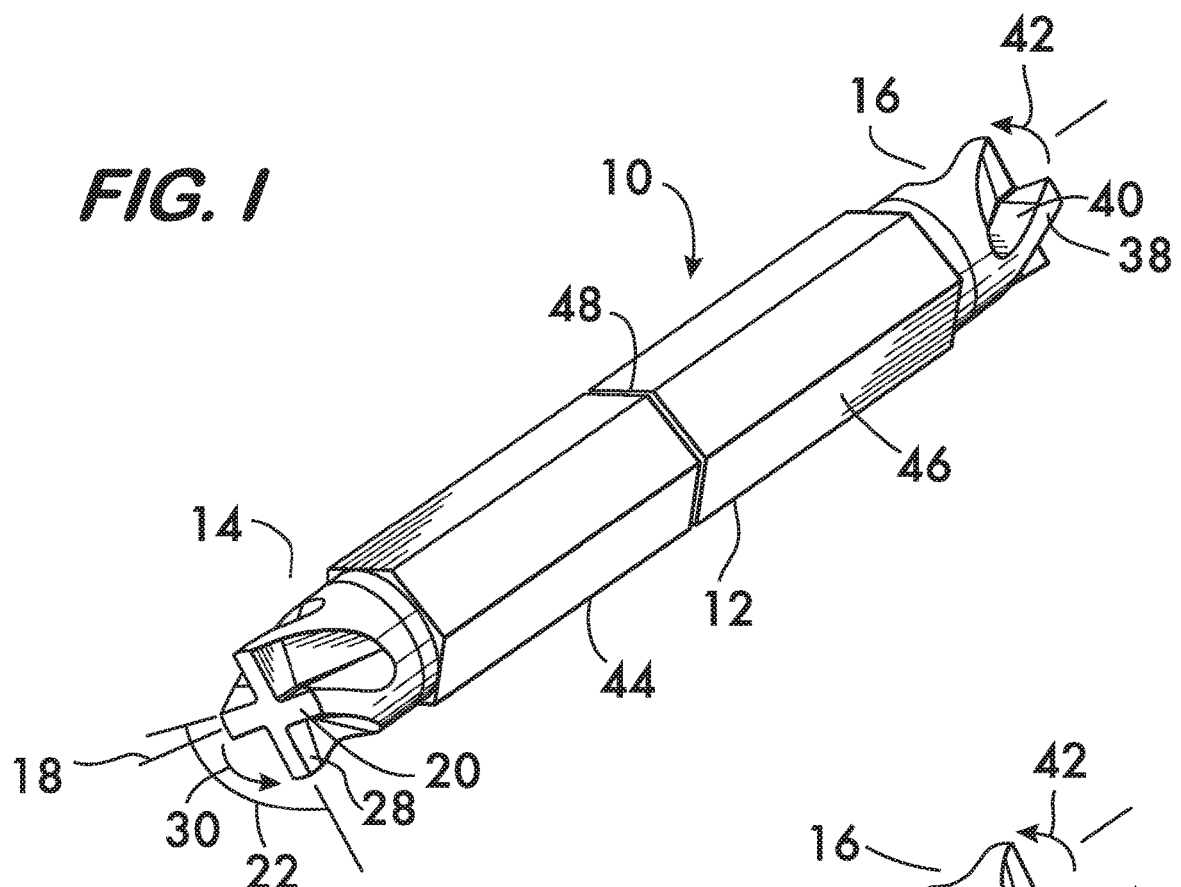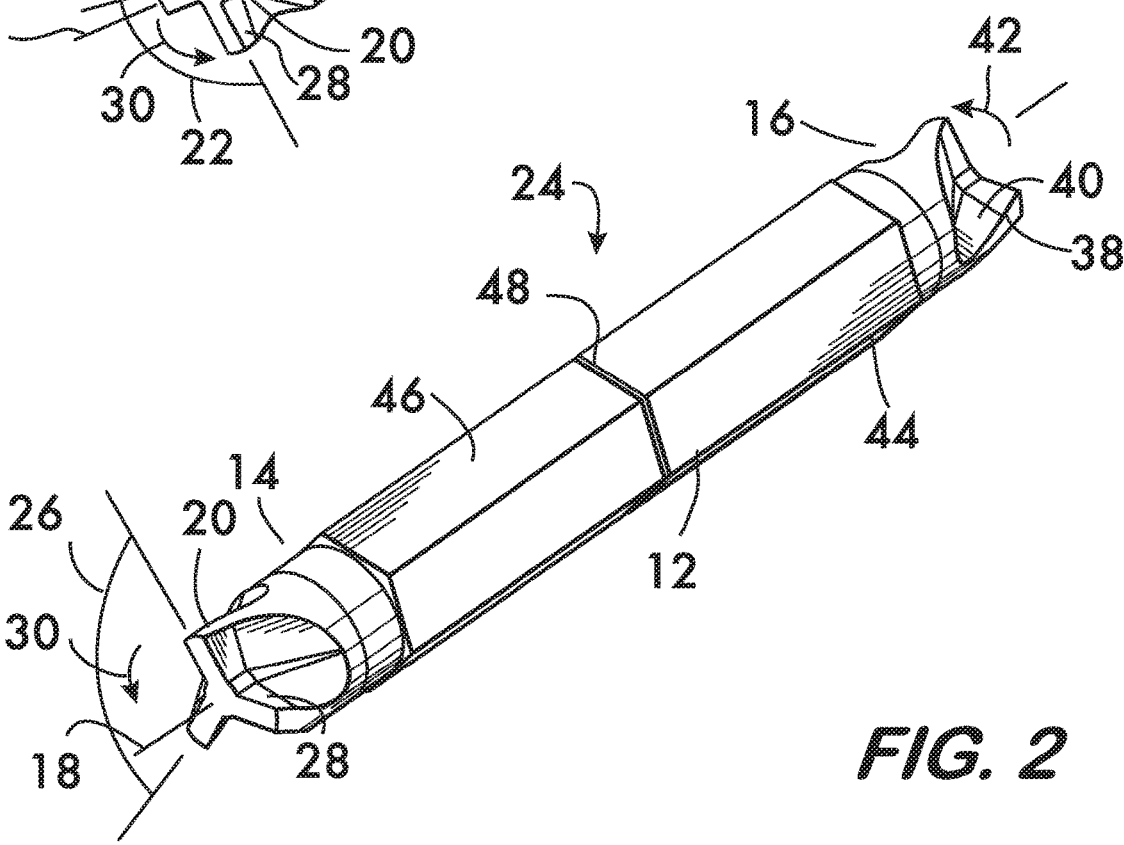

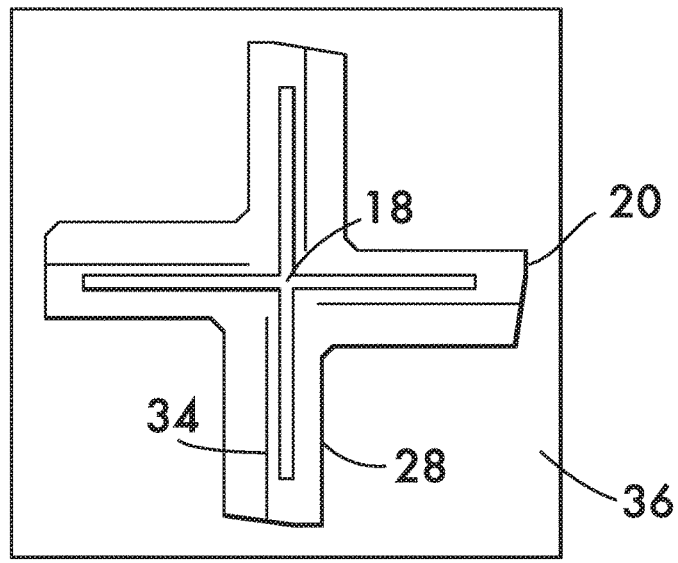
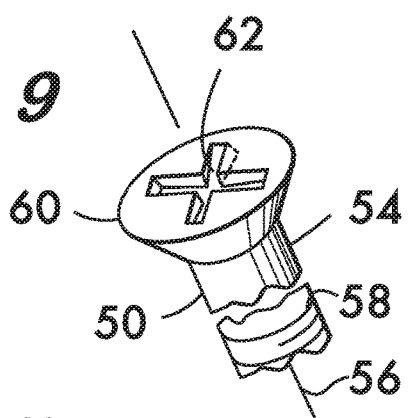
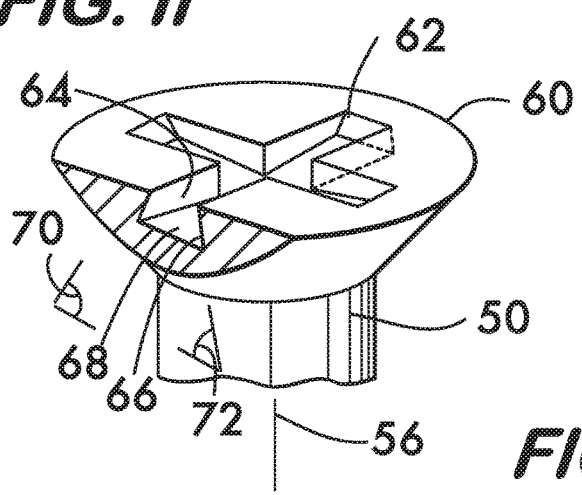
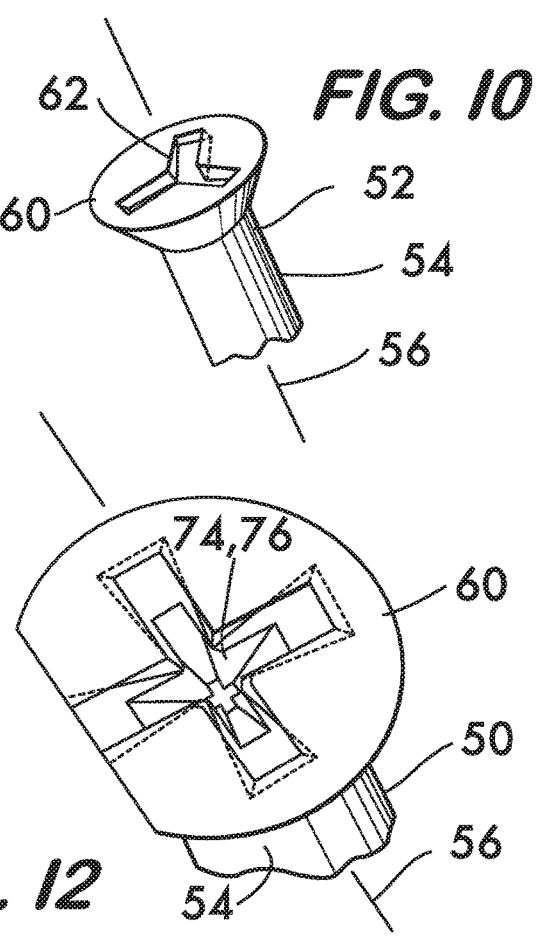

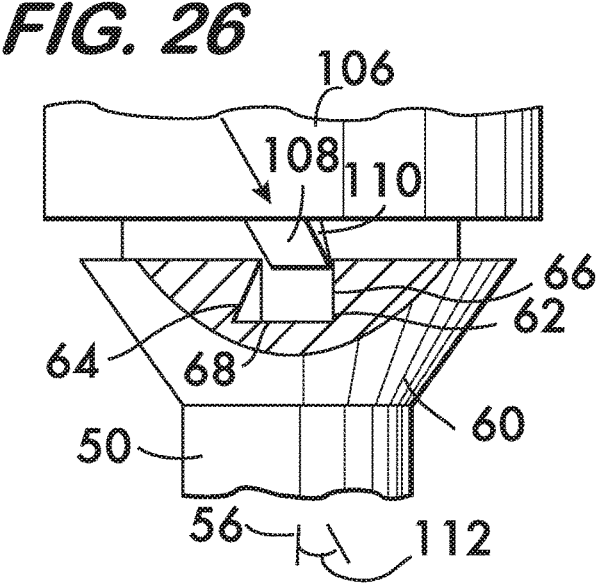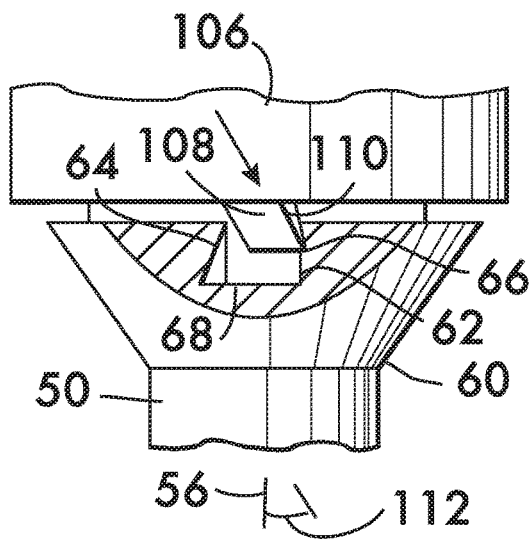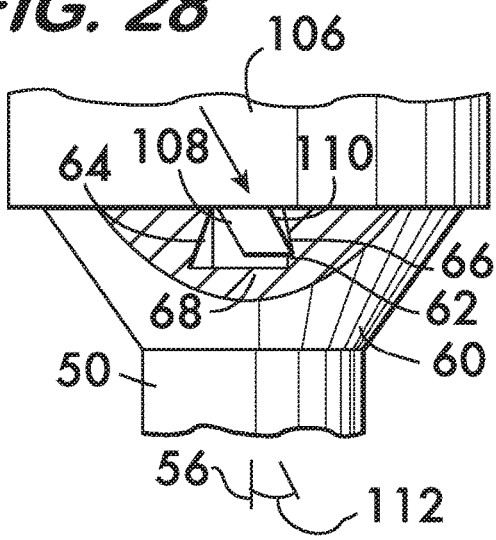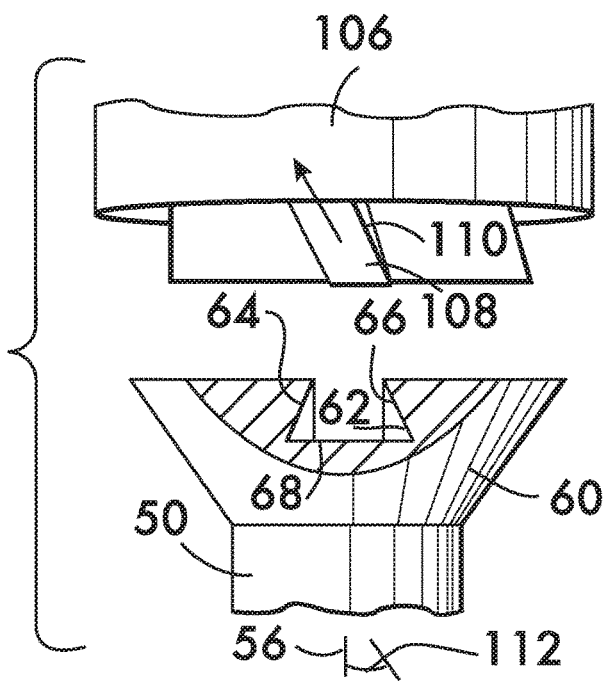
FIG. 26
FIG. 27
FIG. 28
FIG. 29

US 10,780,559 B2

HELICAL TOOTHED DRIVER AND COMPATIBLE FASTENER

Cross REFERENCE TO RELATED APPLICATIONS

This application is based upon and claims benefit of priority to U.S. Provisional Application No. 62/489,891, filed Apr. 25, 2017; to U.S. Provisional Application No. 62/490,426, filed Apr. 26, 2017; to U.S. Provisional Application No. 62/503,719, filed May 9, 2017; and to U.S. Provisional Application No. 62/503,726, filed May 9, 2017, all of these provisional applications being incorporated by reference herein in their entirety.

FIELD OF THE INVENTION

This invention relates to drivers for applying torque to threaded fasteners.

BACKGROUND

Anyone who has driven threaded fasteners has, at some time, unintentionally stripped the head of a fastener, i.e. deformed the slots or recesses in the head so that it is no longer possible to apply torque to the fastener with a driving tool. A threaded fastener with a stripped head causes any number of well-known difficulties and it is desirable to avoid this situation. While it is possible to strip a head with a manual tool such as a common screwdriver, head stripping is more likely to occur, and occur frequently, when a power tool is used to rotate the driver. It is not always possible to apply sufficient axial force to the tool to maintain the driver engaged with the head of the fastener to deliver the torque necessary to turn and advance it. Power tools, with their capability for high rotational speed and significant torque can very rapidly ruin the head of any fastener as the tool turns against the head, riding in an out of the slots or recesses, without turning the fastener. There is clearly a need for a combination driver and threaded fastener which mitigates the potential for damaging the head of the fastener by stripping.

SUMMARY

The invention concerns a driver for applying torque to a threaded fastener. In one example embodiment the driver comprises a body having first and second ends oppositely disposed. A longitudinal axis extends lengthwise along the body between the first and second ends. A plurality of first teeth are positioned at the first end of the body. The first teeth extend lengthwise along and project away from the longitudinal axis. The first teeth have a helical twist about the longitudinal axis. Each one of the first teeth defines a respective first engagement surface oriented angularly with respect to the longitudinal axis. The first engagement surfaces are adapted for engagement with the threaded fastener.

Another example embodiment comprises a plurality of second teeth positioned at the second end of the body. The second teeth extend lengthwise along and project away from the longitudinal axis. The second teeth have a helical twist about the longitudinal axis in a sense opposite to the first teeth. Each one of the second teeth defines a respective second engagement surface oriented angularly with respect to the longitudinal axis. The second engagement surfaces are adapted for engagement with the threaded fastener.

In one example embodiment the first engagement surfaces comprise flat surfaces. In another example embodiment the first engagement surfaces comprise curved surfaces. By way of example, the curved surfaces may be selected from the group consisting of convex surfaces and concave surfaces.

In an example embodiment, the body has an outer surface. A portion of the outer surface positioned between the first and second ends comprises a plurality of flat surfaces in this example. Further by way of example, a groove extends circumferentially around the body. The groove is positioned between the first and second ends.

On example driver embodiment comprises at most three of the first teeth. In such an example, the first teeth may be distributed about the longitudinal axis at angles of 120° from one another about the longitudinal axis. Another example driver embodiment comprises at most four of the first teeth. In such an example the first teeth may be distributed about the longitudinal axis at angles of 90° from one another about the longitudinal axis.

In a specific example embodiment, each of the first teeth has a respective neutral axis taken in a plane perpendicular to the longitudinal axis of the body, wherein each the neutral axis does not intersect the longitudinal axis of the body.

By way of example, the first engagement surfaces may have an orientation angle from 15° to 60° measured relatively to the longitudinal axis. In a specific example embodiment, the first engagement surfaces have an orientation angle of 30° measured relatively to the longitudinal axis.

In another example embodiment, the first and second engagement surfaces may comprise flat surfaces. In yet another embodiment, the first and second engagement surfaces may comprise curved surfaces. By way of example, the curved surfaces may be selected from the group consisting of convex surfaces and concave surfaces.

In an example driver, each of the first and second teeth may have a respective neutral axis taken in a plane perpendicular to the longitudinal axis of the body, wherein each the neutral axis does not intersect the longitudinal axis of the body.

By way of example, the first and second engagement surfaces may have an orientation angle from 15° to 60° measured relatively to the longitudinal axis. In a particular example, the first and second engagement surfaces may have an orientation angle of 30° measured relatively to the longitudinal axis.

BRIEF DESCRIPTION OF THE DRAWINGS

FIG. 1 is an isometric view of an example embodiment of a driver according to the invention;

FIG. 2 is an isometric view of another example embodiment of a driver according to the invention;

FIG. 8 is an end view of an example driver according to the invention;

FIG. 9 is an isometric view of an example embodiment of a threaded fastener according to the invention;

FIG. 10 is an isometric view of another example embodiment of a threaded fastener according to the invention;

FIG. 11 is a partial sectional isometric view of a portion of the fastener shown in FIG. 9;

FIG. 12 is a partial isometric view of a portion of the fastener shown in FIG. 9;

FIGS. 16-29 are partial sectional side views illustrating an example method of manufacture of an example fastener according to the invention;

DETAILED DESCRIPTION

Figure 3:
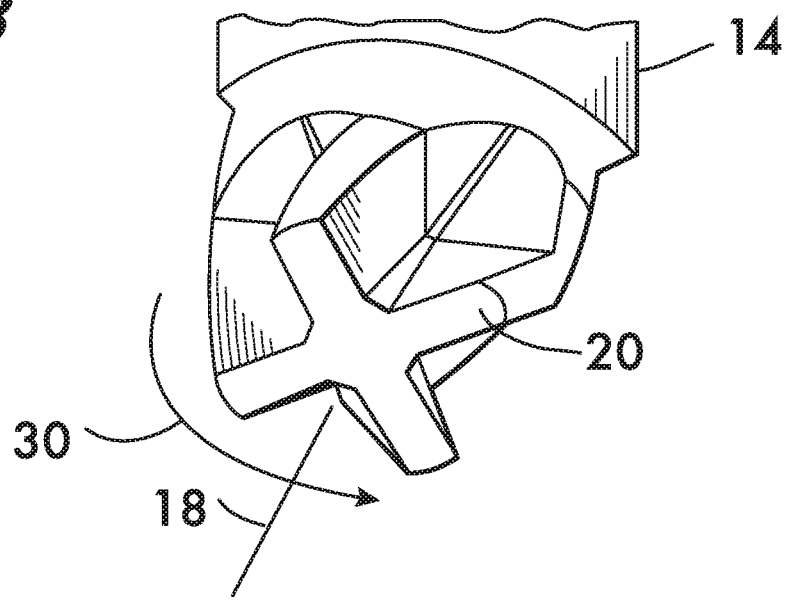
FIG. 3 is an isometric view of a portion of the driver shown in FIG. 1.

FIG. 1 shows an example embodiment of a driver 10 according to the invention for applying torque to a threaded fastener. Driver 10 comprises a body 12 having a first end 14 and a second end 16 oppositely disposed from the first end. A longitudinal axis 18 extends lengthwise along body 12 between the first and the second ends 14 and 16. A plurality of first teeth 20 are positioned at the first end 14 of body 12. In this example there are four first teeth 20 distributed about the longitudinal axis 18 at angles 22 of 90° from one another. In another example driver 24, shown in FIG. 2, there are three first teeth 20 attached to the first end 14 of body 12. In the three toothed embodiment 22, the first teeth 20 are distributed about the longitudinal axis 18 at angles 26 of 120° from one another.

Figure 4:
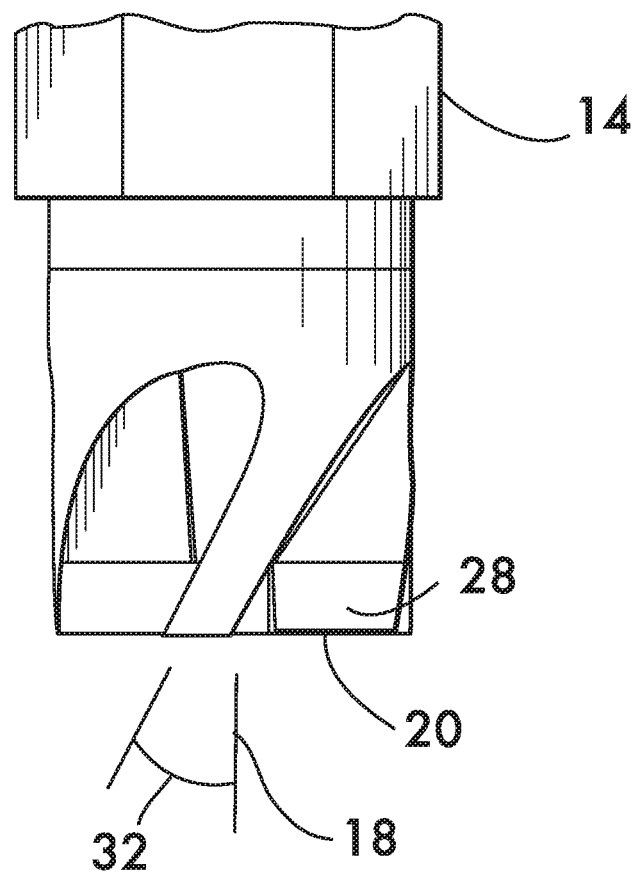
FIG. 4 is a side view of a portion of the driver shown in FIG. 1.
Figure 5:
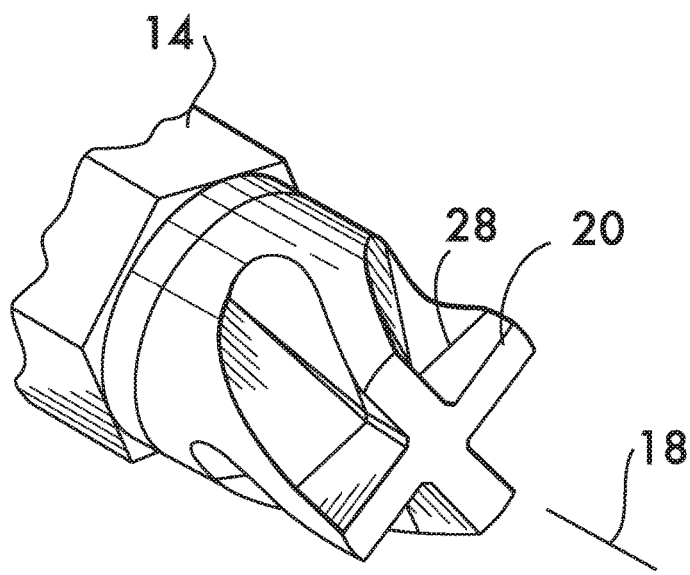
FIG. 5 is an isometric view of a portion of the driver shown in FIG. 1.
Figure 6:
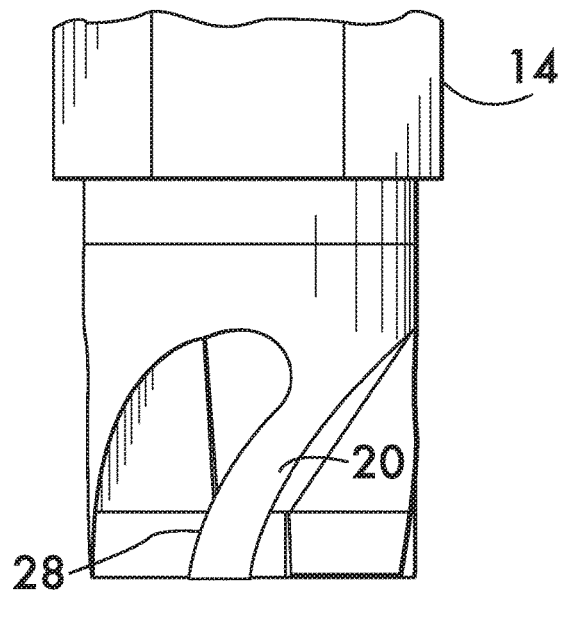
FIG. 6 is a side view of a portion of an alternate embodiment the driver shown in FIG. 1.
Figure 7:
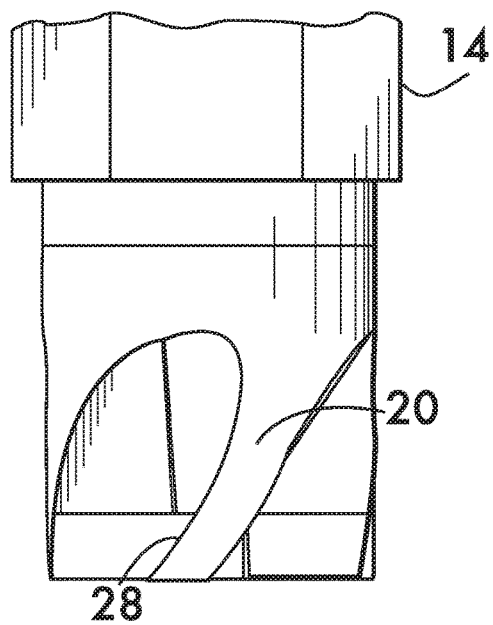
FIG. 7 is a side view of a portion of an alternate embodiment of the driver shown in FIG. 1.

As shown in FIGS. 1 and 2, first teeth 20 extend lengthwise along the longitudinal axis 18 and project outwardly therefrom. Each one of the first teeth 20 defines a respective first engagement surface 28. As described below, the engagement surfaces 28 of the teeth 20 engage surfaces of a compatible screw fastener to apply torque to the fastener. As shown in FIG. 3, the first teeth 20 (regardless of their number) have a helical twist 30 about the longitudinal axis 18. A pitch of 30° per inch has been found feasible for practical three and four toothed designs. As shown in FIG. 4, the helical twist 30 imparts an orientation angle 32 to each engagement surface 28, the orientation angle 32 being measured relatively to the longitudinal axis 18. For practical four and three toothed designs the orientation angles 32 may range from about 15° to about 60°, and an orientation angle 32 of about 30° being considered advantageous. As shown in FIG. 5, engagement surfaces 28 may be substantially flat in the longitudinal direction, or may comprise curved surfaces, having convex curvature as shown in FIG. 6, or concave curvature as shown in FIG. 7.

It is furthermore feasible to strengthen the teeth 20 by increasing their thickness. It is advantageous to thicken the teeth 20 by adding material to the sides opposite to the engagement surfaces 28. As shown in FIG. 8, this shifts the neutral axes 34 of the teeth 20 at every cross section such that they do not intersect the longitudinal axis 18 of body 12 (the neutral axes 34 being defined in a plane 36 perpendicular to the longitudinal axis 18 of body 12 and projecting away therefrom).

As shown in FIGS. 1 and 2, driver 10 may also comprise a plurality of second teeth 38 positioned at the second end 16 of the body 12. The figures illustrate both three and four toothed example embodiments. The second teeth 38 are similar to the first teeth 20 in that they define angularly oriented second engagement surfaces 40 having the same characteristics as described above for the first engagement surfaces 28. However, it is advantageous for the second teeth 38 to have a helical twist 42 in a sense opposite to the helical twist 30 of the plurality of first teeth 20. FIGS. 1 and 2 illustrate this feature; when the driver is viewed along the longitudinal axis 18 from the first end 14 of the body 12, the helical twist 30 is in the counterclockwise sense; when viewed along the longitudinal axis 18 from the second end 16 of body 12 the helical twist 42 is in a clockwise sense. This twist arrangement permits the driver 10 (or 24) to be used to both drive a threaded fastener or remove it as described below.

As further shown in FIGS. 1 and 2, the body 12 of the driver (10 or 24) has an outer surface 44 positioned between the first and second ends 14 and 16. A portion of outer surface 44 comprises a plurality of flat surfaces 46. A groove 48 may also extend circumferentially around the body 12, the groove 48 being positioned between the first and second ends 14 and 16 and cutting through the flat surfaces 46. These features permit the driver to be used with automatic and/or manual driver tools (see FIGS. 30 and 31). The flat surfaces 46 engage complementary flat surfaces within a socket in the shaft of the driver tool which forces the driver 10 or 24 to turn with the shaft when torque is applied. Groove 48 can accept the ball or plunger of a spring biased detent, allowing the driver tool to securely hold driver 12 or 24 within the socket yet allow it to be changed out quickly. It is advantageous to make drivers 10 and 24 from robust materials including metals such as steel, brass, bronze and aluminum to cite a few examples.

The invention further encompasses threaded fasteners which are compatible with drivers according to the invention. FIGS. 9 and 10 illustrate two example embodiments of compatible threaded fasteners 50 and 52 respectively. Each fastener 50 and 52 comprises a shaft 54 having a longitudinal axis 56. A plurality of helical threads 58 extend around at least a portion of the shaft 54. A head 60 is positioned at an end of shaft 54. Head 60 has a plurality of first recesses 62 therein. The recesses 62 extend outwardly from the longitudinal axis 56 of the shaft 54. The example embodiment 50, shown in FIG. 9, comprises four recesses 62 distributed about the longitudinal axis 56 at angles of 90° from one another. Example embodiment 52, shown in FIG. 10, comprises three recesses 62 distributed about the longitudinal axis 56 at angles of 120° from one another.

With reference to FIGS. 11 and 12, for both example fastener embodiments 50 and 52, each recess 62 is defined by first and second side surfaces 64 and 66 and a floor surface 68. As shown in FIG. 11 for fastener 50, side surfaces 64 and 66 are oppositely disposed from one another and the floor surface extends between them. Each side surface 64 and 66 is oriented at a respective acute angle 70, 72 relatively to the floor surface 68. To accommodate the helical twist of teeth 20 or 38 of the drivers 10 or 24, the acute angles 70 and 72 vary with distance from the longitudinal axis 56. In the example fastener embodiments 50 and 52 the angles 70 and 72 of side surfaces 64 and 66 become smaller (more acute) with increasing distance from the longitudinal axis 56. For practical designs the minimum value of acute angles 70 and 72 may range from about 15° to about 60°, with an angle of about 30° being considered advantageous. As shown in FIG. 12, for fastener embodiment 50, head 60 may further comprise a second recess 74 having a cruciform shape 76 adapted to receive a Phillips head driver. Second recess 74 has its center aligned with the longitudinal axis 56 of shaft 54 and the cruciform shape 76 matches the arrangement of the first recesses 62. In this configuration the fastener 50 may accept not only the driver 10 according to the invention but also a Phillips head driver. The invention furthermore encompasses any type of threaded fastener such as wood screws, sheet metal screws, machine screws, drywall screws, bone screws, socket screws as well as bolts such as lag bolts, carriage bolts, hex head bolts as well as any type of head such as the flat heads illustrated, pan head, button head, dome head and oval head to cite examples.

Figure 13:
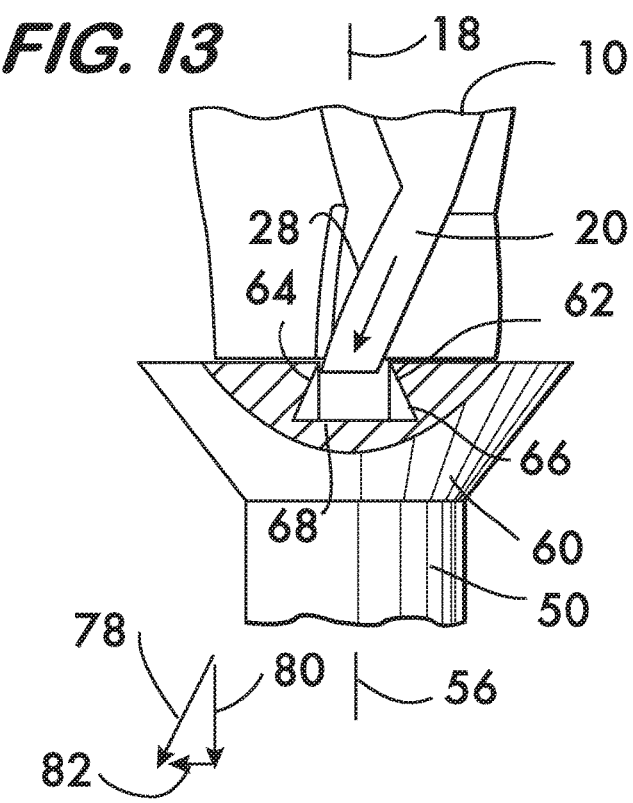
FIGS. 13-15 are partial sectional side views illustrating use of the driver shown in FIG. 1 with the fastener shown in FIG. 9.
Figure 14:
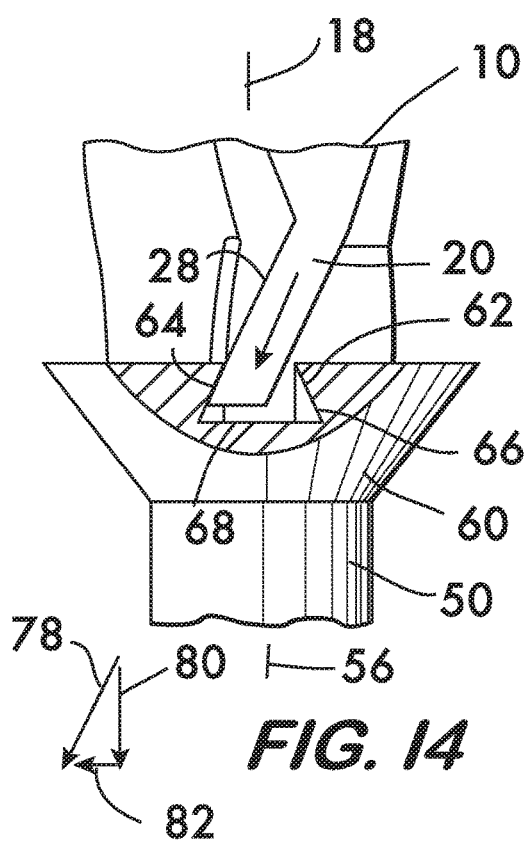
Figure 15:
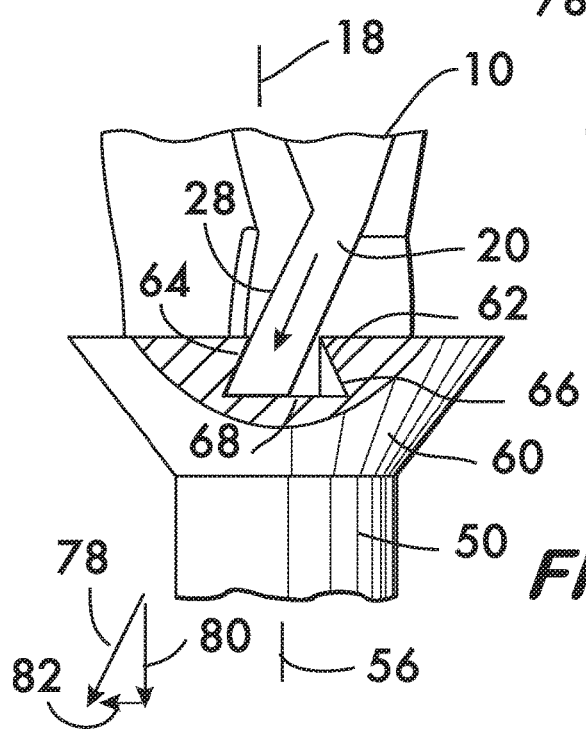

Operation of example driver 10 advancing a right-hand threaded fastener 50 is shown in FIGS. 13-15 (the principles of operation described are the same for driver 24). As shown in FIG. 13, the first teeth 20 of driver 10 engage the recesses 62 in head 60 of threaded fastener 50. As the teeth 20 enter the recesses 62 a clockwise torque (when viewed facing the head 60) is applied to driver 10 about its longitudinal axis 18. The torque rotates the driver 10 and forces the engagement surfaces 28 of teeth 20 into contact with the first side surfaces 64 of the recesses 62. The angular orientation of the engagement surfaces 28 and the side surfaces 64 relative to the longitudinal axes 18 and 56 of the driver 10 and the fastener 50 (which become the axis of rotation) causes the force vector 78 between the engagement surfaces 28 and the side surfaces 64 to be resolved into a component 80 along the longitudinal axes 18 and 56 and a component 82 perpendicular to it. Force component 80 along the longitudinal axes 18 and 56 causes the driver 10 to move deeper into the recesses 62 as shown in FIG. 14. Note that this occurs purely as a result of the torque applied to the driver 10; there is no separate axial force being applied. The engagement surfaces 28 slide over the side surfaces 64 into the recesses 62 due to the torque and their angular orientation. Once the teeth 20 bottom out on the floor surfaces 68 (see FIG. 15) the perpendicular force components 82 at the interface between the teeth 20 and the side surfaces 64 act against the side surfaces to apply torque to the fastener 50, which, having right-handed threads, rotates and advances into its work piece. The torque on the driver 10 serves to more firmly lock the driver to the fastener head 60, thereby preventing the driver from disengaging from the fastener head, regardless of the applied axial force. This prevents the driver 10 from riding in and out of the recesses 62 without turning the fastener and thereby stripping the head, which often occurs with prior art drivers when insufficient axial force is applied for the torque required to turn the fastener. The problem is especially acute when power tools are used, because they can apply significant torque at significant rotational speed. This combination of torque and rotational speed almost guarantees that the head will be stripped if the driver does not remain reliably engaged with the fastener, as is ensured with the drivers 10 and 24 and fasteners 50 and 52 according to the invention.

Further, the driver 10 cannot be disengaged from the fastener by simply drawing it axially away from the fastener. The angular orientation of the teeth 20 and the side surfaces 64 provides mechanical engagement between fastener and driver which prevents direct removal. To effect removal, the driver 10 must be rotated counterclockwise to disengage the teeth 20 from the side surfaces 64 as the driver is withdrawn.

Driver 10 may also be used to remove fastener 50. To effect removal, the second teeth 38 positioned on the second end 16 of driver 10 engage the recesses 62 in head 60 of threaded fastener 50. As the teeth 38 enter the recesses 62 a counterclockwise torque (when viewed facing the head 60) is applied to driver 10 about its longitudinal axis 18. Because the helical twist of the teeth 38 on end 16 is opposite in sense to the teeth 20 on end 14 of the driver 10, the counterclockwise torque rotates the driver 10 and forces the engagement surfaces 28 of teeth 20 into contact with the second side surfaces 66 of the recesses 62, the second side surfaces 66 being angularly oriented opposite to side surfaces 64. The angular orientation of the engagement surfaces 28 and the side surfaces 66 relative to the longitudinal axes 18 and 56 of the driver 10 and the fastener 50 (which become the axis of rotation) causes the force vector between the engagement surfaces 28 and the side surfaces 66 to be resolved into a component along the longitudinal axes 18 and 56 and a component perpendicular to it. The force component along the longitudinal axes 18 and 56 causes the driver 10 to move deeper into the recesses 62. Note that this occurs purely as a result of the torque applied to the driver 10; there is no separate axial force being applied. The engagement surfaces 28 slide over the side surfaces 66 into the recesses 62 due to the torque and their angular orientation. Once the teeth 20 bottom out on the floor surfaces 68, the perpendicular force components at the interface between the teeth 20 and the side surfaces 66 act against the side surfaces to apply torque to the fastener 50, which, having right-handed threads, rotates and retreats out from the work piece. The torque on the driver 10 serves to more firmly lock the driver to the fastener head 60, thereby preventing the driver from disengaging from the fastener head, regardless of the applied axial force. This prevents the driver 10 from riding in and out of the recesses 62 without turning the fastener and thereby stripping the head, which often occurs with prior art drivers when insufficient axial force is applied for the torque required to turn the fastener.

Further, the driver 10 cannot be disengaged from the fastener by simply drawing it axially away from the fastener. The angular orientation of the teeth 20 and the side surfaces 66 provides mechanical engagement between fastener and driver which prevents direct removal. To effect removal, the driver 10 must be rotated clockwise to disengage the teeth 38 from the side surfaces 66 as the driver is withdrawn.

Figure 16:
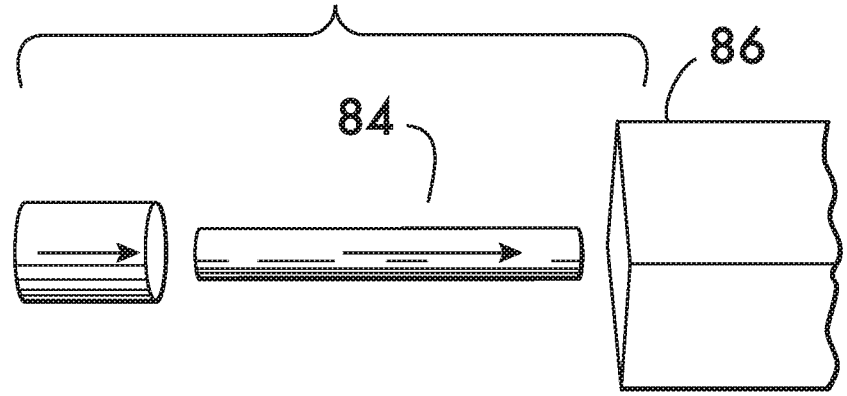
Figure 17:
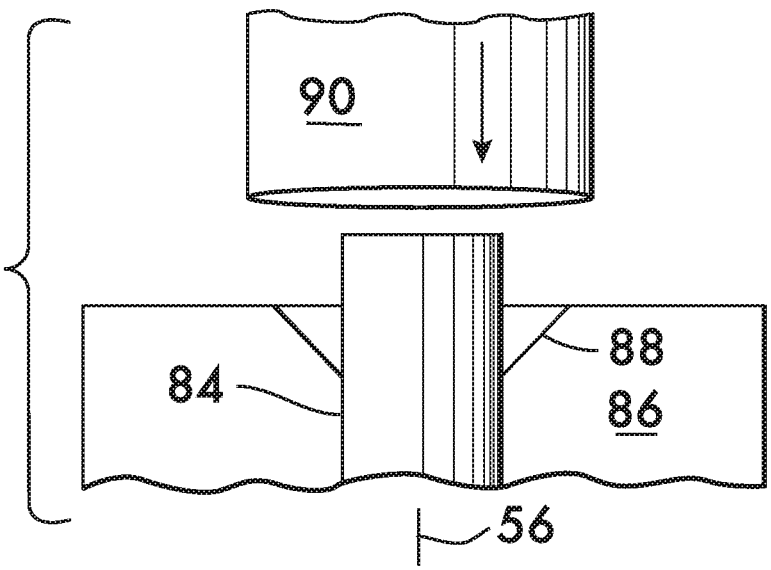
Figure 18:
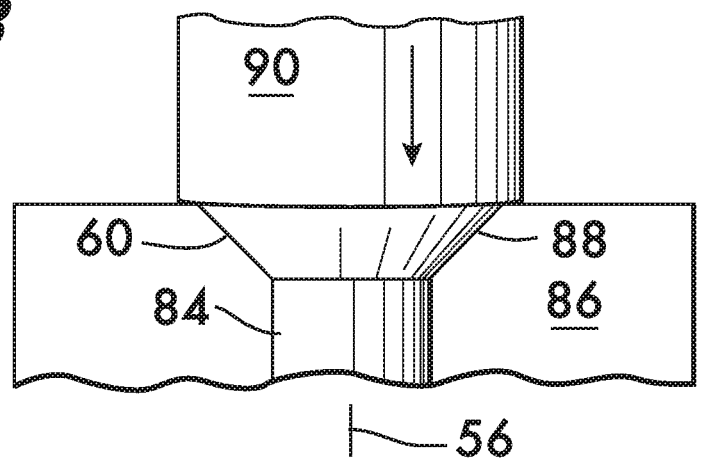
Figure 19:
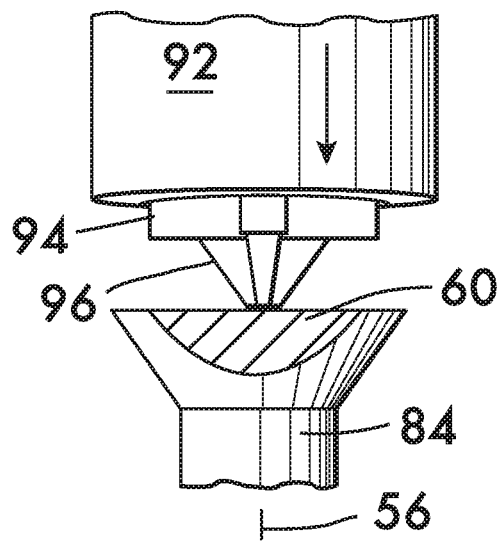
Figure 20:
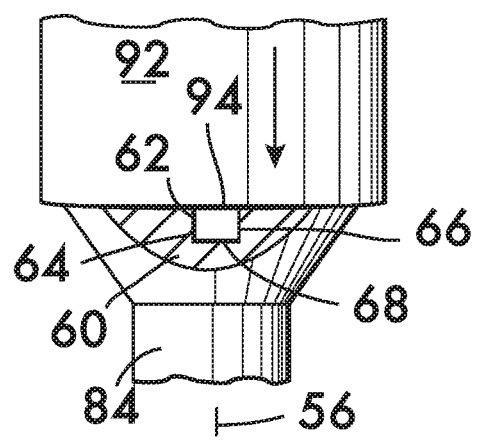
Figure 21:
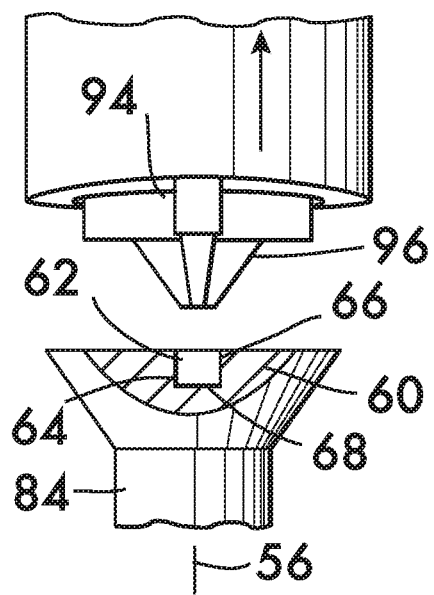

The invention also encompasses a method of manufacturing threaded fasteners according to the invention. An example manufacturing method for a flat head fastener such as 50 is shown in FIGS. 16-29. As shown in FIG. 16, a cylindrical blank 84 is loaded into a die 86. FIG. 17 shows a portion of the die in section, the die having a conical surface 88. As shown in FIG. 18, blank 84 is compressed within the die 86 along longitudinal axis 56 by a flat surfaced head forming tool 90 which deforms the end of the blank 84 to form the head 60 of the fastener, the head conforming to the die's conical surface 88 and the flat surface of the head forming tool 90. With the blank 84 still in the die 86 as shown in FIG. 19 (die not shown), a recess forming tool 92 is forced into the head 60. In this example the recess forming tool 92 has projecting contours 94 which form a plurality of the first recesses 62 in the head 60 when the head is deformed by compressing it between the recess forming tool 92 and the die 86 as shown in FIGS. 20 and 21. Contours 94 form the first and second side surfaces 64 and 66 and the floor surfaces 68 of the recesses 62. In this example the recess forming tool 92 also has additional projecting contours 96 which form the second recess 74 simultaneously with the plurality of first recesses. In this example the projecting contours 96 have a cruciform shape to form a second recess 74 having the cruciform shape 76 adapted to receive a Phillips head drivers (see FIG. 12).

Figure 22:
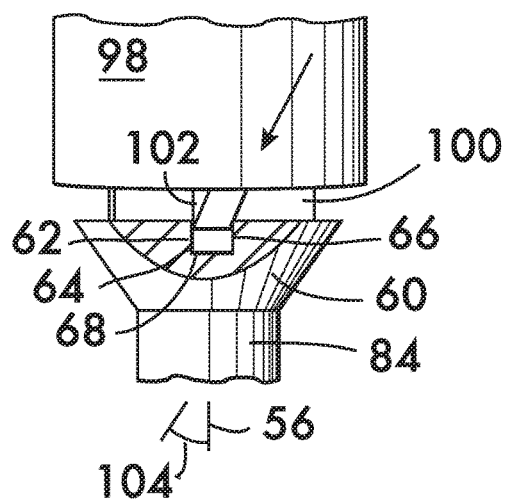
Figure 23:
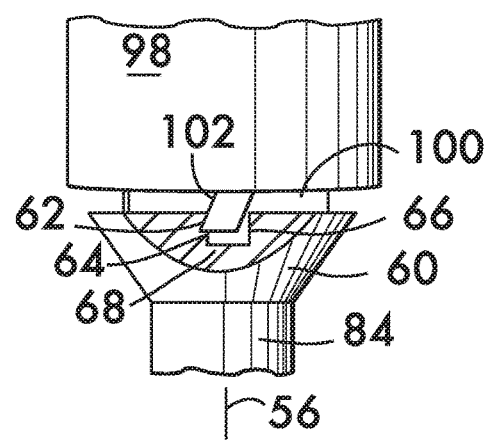
Figure 24:
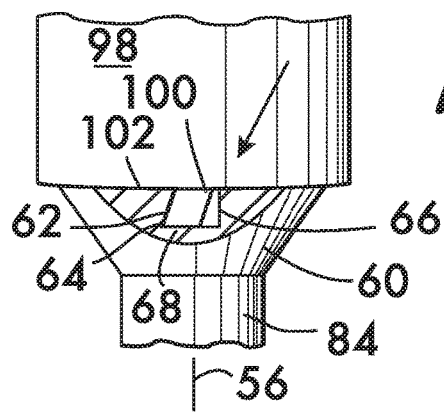
Figure 25:
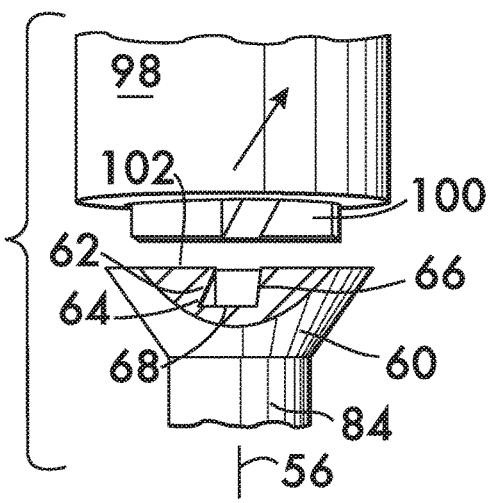

Next, as shown in FIGS. 22-24, the first side surfaces 64 of the first recesses 62 are deformed such that the first side surfaces are oriented at an acute angle relatively to the floor surfaces 68. In this example, deformation of the first side surfaces 64 is effected using a first tool 98 and die 86. First tool 98 comprises first teeth 100 projecting therefrom, each first tooth having a first bearing surface 102 oriented at a first angle 104 with respect to the longitudinal axis 56. Side surfaces 64 are deformed to their desired acute angles by compressing head 60 along longitudinal axis 56 between the first tool 98 and die 86 while simultaneously rotating the first tool about the longitudinal axis 56 in a first direction (in this instance, in a clockwise sense when viewed facing the head 60). The simultaneous axial motion and rotation of the first tool 98 forces the bearing surfaces 102 into engagement with the side surfaces 64, which take on the angle 104 of the bearing surface 102 of teeth 100. As shown in FIG. 25, the first tool 98 is removed from engagement with head 60 by simultaneously rotating the tool about the longitudinal axis 56 and withdrawing the tool therealong, rotation being in the counterclockwise sense in this instance. To form fastener 50 with four recesses the first tool 98 comprises four first teeth 100. To form fastener 52 with three recesses the first tool 98 comprises three first teeth 100.

Next, as shown in FIGS. 26-28, the second side surfaces 66 of the first recesses 62 are deformed such that the second side surfaces are oriented at an acute angle relatively to the floor surfaces 68. In this example, deformation of the second side surfaces 66 is effected using a second tool 106 and die 86. Second tool 106 comprises second teeth 108 projecting therefrom, each second tooth having a second bearing surface 110 oriented at a second angle 112 with respect to the longitudinal axis 56. Side surfaces 66 are deformed to their desired acute angles by compressing head 60 along longitudinal axis 56 between the second tool 106 and die 86 while simultaneously rotating the second tool about the longitudinal axis 56 in a second direction (in this instance, in a counterclockwise sense when viewed facing the head 60). The simultaneous axial motion and rotation of the second tool 106 forces the bearing surfaces 110 into engagement with the side surfaces 66, which take on the angle 112 of the bearing surface 110 of teeth 108. As shown in FIG. 29, the second tool 106 is removed from engagement with head 60 by simultaneously rotating the tool about the longitudinal axis 56 and withdrawing the tool therealong, rotation being in the clockwise sense in this instance. To form fastener 50 with four recesses the second tool 106 comprises four second teeth 108. To form fastener 52 with three recesses the second tool 106 comprises three second teeth 108. The fastener 50 or 52 may then be finished by forming helical threads 58 around the shaft 54 (see FIG. 9).

Figure 30:
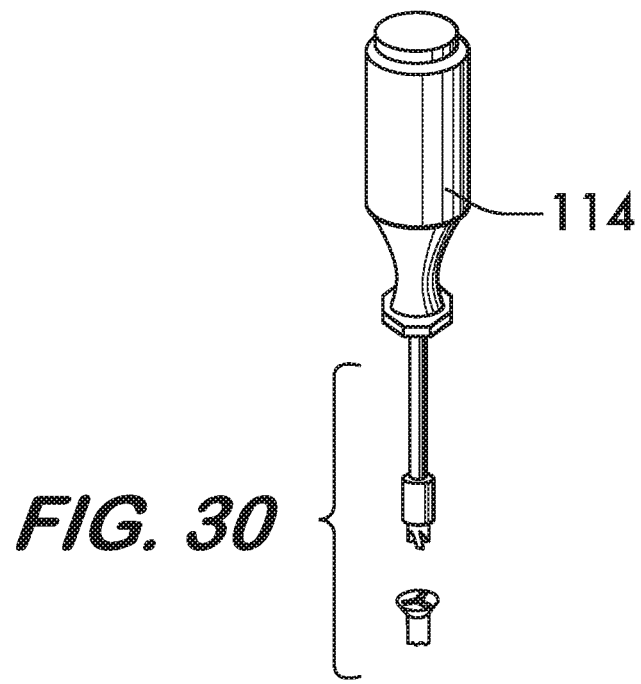
FIG. 30 shows a manual tool using an example driver according to the invention.
Figure 31:
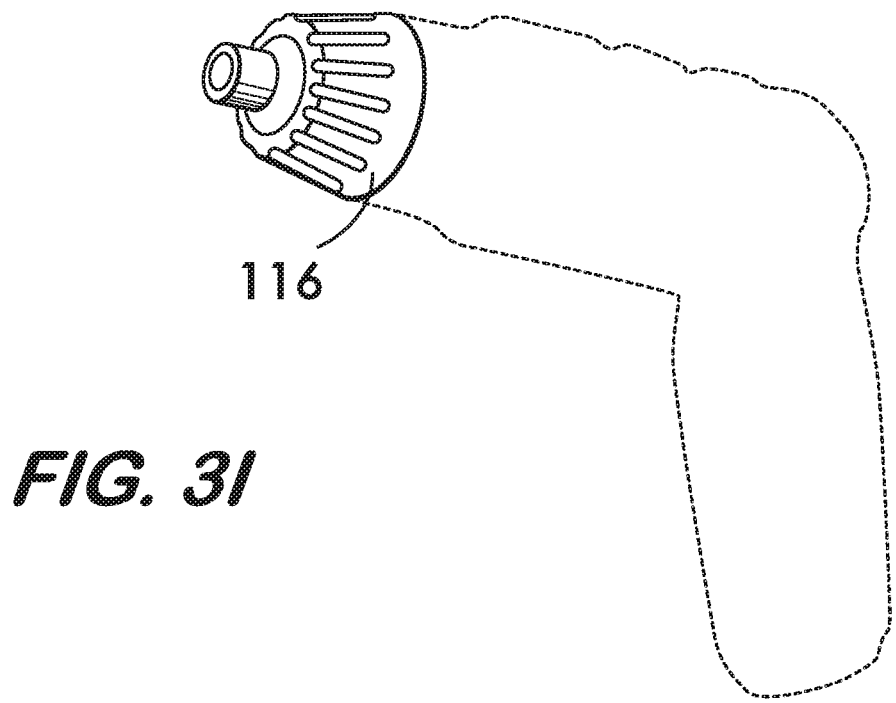
FIG. 31 shows a power tool for use with an example driver according to the invention.

Drivers according to the invention may be used with manual tools 114 as shown in FIG. 30, or with power tools 116 as shown in FIG. 31 and are expected to significantly reduce the potential for stripping the heads of threaded fasteners.

What is claimed is:

1. A driver for applying torque to a threaded fastener, said driver comprising:
a body having first and second ends oppositely disposed, a longitudinal axis extending lengthwise along said body between said first and second ends;
a plurality of first teeth positioned at said first end of said body, said first teeth extending lengthwise along and projecting away from said longitudinal axis, said first teeth having a helical twist about said longitudinal axis, each one of said first teeth defining a respective first engagement surface, said first engagement surfaces are oriented at an angle from 15 degrees to 60 degrees measured with respect to said longitudinal axis, said first engagement surfaces adapted for engagement with said threaded fastener.

2. The driver according to claim 1, further comprising a plurality of second teeth positioned at said second end of said body, said second teeth extending lengthwise along and projecting away from said longitudinal axis, said second teeth having a helical twist about said longitudinal axis having an opposite handedness to said first teeth, each one of said second teeth defining a respective second engagement surface oriented angularly with respect to said longitudinal axis, said second engagement surfaces adapted for engagement with said threaded fastener.

3. The driver according to claim 1, wherein said first engagement surfaces comprise flat surfaces.

4. The driver according to claim 1, wherein said first engagement surfaces comprise curved surfaces.

5. The driver according to claim 4, wherein said curved surfaces are selected from the group consisting of convex surfaces and concave surfaces.

6. The driver according to claim 1, wherein said body has an outer surface, a portion of said outer surface positioned between said first and second ends comprising a plurality of flat surfaces.

7. The driver according to claim 6, further comprising a groove extending circumferentially around said body, said groove positioned between said first and second ends.

8. The driver according to claim 1, comprising at most three of said first teeth.

9. The driver according to claim 8, wherein said first teeth are distributed about said longitudinal axis at angles of 120° from one another about said longitudinal axis.

10. The driver according to claim 1, comprising at most four of said first teeth.

11. The driver according to claim 10, wherein said first teeth are distributed about said longitudinal axis at angles of 90° from one another about said longitudinal axis.

12. The driver according to claim 10, wherein each of said first teeth has a respective neutral axis taken in a plane perpendicular to said longitudinal axis of said body, wherein each said neutral axis does not intersect said longitudinal axis of said body.

13. The driver according to claim 1, wherein said first engagement surfaces have an orientation angle of 30° measured relatively to said longitudinal axis.

14. The driver according to claim 2, wherein said first and second engagement surfaces comprise flat surfaces.

15. The driver according to claim 2, wherein said first and second engagement surfaces comprise curved surfaces.

16. The driver according to claim 15, wherein said curved surfaces are selected from the group consisting of convex surfaces and concave surfaces.

17. The driver according to claim 2, wherein said body has an outer surface, a portion of said outer surface positioned between said first and second ends comprising a plurality of flat surfaces.

18. The driver according to claim 17, further comprising a groove extending circumferentially around said body, said groove positioned between said first and second ends.

19. The driver according to claim 2, comprising at most three of said first teeth and three of said second teeth.

20. The driver according to claim 19, wherein said first and second teeth are distributed about said longitudinal axis at angles of 120° from one another about said longitudinal axis.

21. The driver according to claim 2, comprising at most four of said first teeth and four of said second teeth.

22. The driver according to claim 21, wherein said first and second teeth are distributed about said longitudinal axis at angles of 90° from one another about said longitudinal axis.

23. The driver according to claim 21, wherein each of said first and second teeth has a respective neutral axis taken in a plane perpendicular to said longitudinal axis of said body, wherein each said neutral axis does not intersect said longitudinal axis of said body.

24. The driver according to claim 2, wherein said first and second engagement surfaces have an orientation angle from 15° to 60° measured relatively to said longitudinal axis.

25. The driver according to claim 2, wherein said first and second engagement surfaces have an orientation angle of 30° measured relatively to said longitudinal axis.

* * * * *